(12) United States Patent
Rodgers et al.

(10) Patent No.: US 11,359,126 B2
(45) Date of Patent: Jun. 14, 2022

(54) FORMULATION AND METHOD FOR DISSOLUTION OF METAL SULFIDES, INHIBITION OF ACID GAS CORROSION, AND INHIBITION OF SCALE FORMATION

(71) Applicant: Baker Hughes, a GE Company, LLC, Houston, TX (US)

(72) Inventors: Patrick James Rodgers, Neuilly-sur-Seine (FR); Brian Lundy, San Antonio, TX (US); Sunder Ramachandran, Sugar Land, TX (US); David J. Poelker, Sugar Land, TX (US); James D. Ott, Kilgore, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/244,028

(22) Filed: Apr. 29, 2021

(65) Prior Publication Data

US 2021/0246354 A1    Aug. 12, 2021

Related U.S. Application Data

(62) Division of application No. 15/927,860, filed on Mar. 21, 2018, now Pat. No. 11,021,642.

(60) Provisional application No. 62/475,470, filed on Mar. 23, 2017.

(51) Int. Cl.
| | |
|---|---|
| *C09K 8/32* | (2006.01) |
| *C09K 8/54* | (2006.01) |
| *C09K 8/528* | (2006.01) |
| *C23G 1/26* | (2006.01) |
| *C23F 11/10* | (2006.01) |
| *C23F 14/02* | (2006.01) |
| *E21B 37/06* | (2006.01) |
| *C10G 75/02* | (2006.01) |
| *C23F 11/167* | (2006.01) |

(52) U.S. Cl.
CPC ............ *C09K 8/32* (2013.01); *C09K 8/528* (2013.01); *C09K 8/54* (2013.01); *C10G 75/02* (2013.01); *C23F 11/10* (2013.01); *C23F 11/167* (2013.01); *C23F 11/1676* (2013.01); *C23F 14/02* (2013.01); *C23G 1/26* (2013.01); *E21B 37/06* (2013.01); *C09K 2208/32* (2013.01)

(58) Field of Classification Search
CPC ...... C09K 8/32; C09K 8/528; C09K 2208/32; C09K 8/54; C10G 75/02; C23F 11/10; C23F 11/167; C23F 11/1676; C23F 14/02; E21B 37/06

See application file for complete search history.

(56) References Cited

U.S. PATENT DOCUMENTS

| | | | |
|---|---|---|---|
| 2003/0226808 A1* | 12/2003 | Fidoe | C02F 5/14 210/699 |
| 2007/0108127 A1* | 5/2007 | Talbot | C23F 14/02 210/639 |
| 2016/0326424 A1* | 11/2016 | Hatchman | C09K 8/54 |

* cited by examiner

*Primary Examiner* — Crystal J. Lee
(74) *Attorney, Agent, or Firm* — Mossman, Kumar & Tyler, PC

(57) ABSTRACT

The present disclosure provides a formulation and methods for simultaneously dissolving metal sulfide scales, inhibiting acid gas corrosion, and inhibiting the formation of calcite and barite in a system having low or high shear stress conditions due to fluid movement, in which the formulation contains a THP+salt, one or more corrosion inhibitors, one or more scale inhibitors, and one or more acid corrosion inhibitors. The formulation may be applied to the system in diluted or undiluted form, and continuously or in batch style.

20 Claims, 3 Drawing Sheets

FORMULATION AND METHOD FOR DISSOLUTION OF METAL SULFIDES, INHIBITION OF ACID GAS CORROSION, AND INHIBITION OF SCALE FORMATION

CROSS-REFERENCE TO RELATED APPLICATION

This application is a divisional of U.S. Ser. No. 15/927,860 filed Mar. 21, 2018 which issues as U.S. Pat. No. 11,021,642 on Jun. 1, 2021 which application claims the benefit of Provisional Patent Application No. 62/475,470 filed Mar. 23, 2017, all of which are incorporated by reference herein in their entireties.

TECHNICAL FIELD

The present invention relates to a formulation to be applied to oilfield fluids and systems that is capable of simultaneously dissolving metal sulfide scales, inhibiting acid gas corrosion, and inhibiting the formation of calcite and barite and also capable of inhibiting corrosion on mild steel even when the formulation is applied in an undiluted form.

BACKGROUND

THP+salts are widely used as metal sulfide dissolvers within aqueous fluids and especially fluids associated with oilfields. THP+salts are sometimes combined with corrosion inhibitors to prevent, reduce, or inhibit the corrosion of metal surfaces that may occur in the production, transportation, storage, and refining of oilfield fluids. Oilfield fluids that contain dissolved acid gases, for example $H_2S$ and $CO_2$, can be corrosive to metal components in the well and surface equipment. To address this problem, corrosion inhibitors are routinely added to the oilfield fluids to reduce or prevent the corrosion caused by dissolved acid gases. In addition, oxygen can accelerate acid gas corrosion on metal surfaces in oilfield fluids. When oxygen is dissolved with the acid gases in a fluid, it may be useful to include corrosion inhibitor additives that are also oxygen tolerant.

Another problem encountered is the formation of calcite and barite scale in oilfield brines that are produced. Wells with multiple zones in the formation that are producing may cause incompatible waters to come in contact resulting in the formation of calcite and barite scales. Organo phosphonate compounds have been used to inhibit such formation of calcite and barite scale in aqueous systems.

While THP+salts are useful for metal sulfide dissolution or dispersion, they are not particularly suited to combat the corrosion and scale formation issues that arise with the production, transportation, storage, and refining of oilfield fluids. Moreover, THP+salts are known to cause rapid corrosion on mild steel and other metal components in a well and thus are generally not injected into a well in an undiluted form.

Thus, it is desirable to provide a less corrosive THP+salt formulation that may be applied to oilfield systems and fluids in an undiluted form and that is also multi-functional: effective in dissolving metal sulfides (to help prevent plugging), as well as inhibiting acid gas corrosion, and inhibiting the formation of calcite and barite.

SUMMARY

There is provided, in one form, a formulation for simultaneously dissolving metal sulfide scales, inhibiting acid gas corrosion, and inhibiting the formation of calcite and barite in a system, the formulation being comprised of a THP+salt, one or more corrosion inhibitors, one or more scale inhibitors, and one or more acid corrosion inhibitors.

There is also provided a method for simultaneously dissolving metal sulfide scales, inhibiting acid gas corrosion, and inhibiting the formation of calcite and barite in a system having low or high shear conditions in which a formulation containing a THP+salt, one or more corrosion inhibitors, one or more scale inhibitors, and an alcohol with an acetylenic bond in the carbon backbone, may be applied to the system an undiluted or diluted form, and continuously injected or in batch application style.

DETAILED DESCRIPTION

Figure 1:
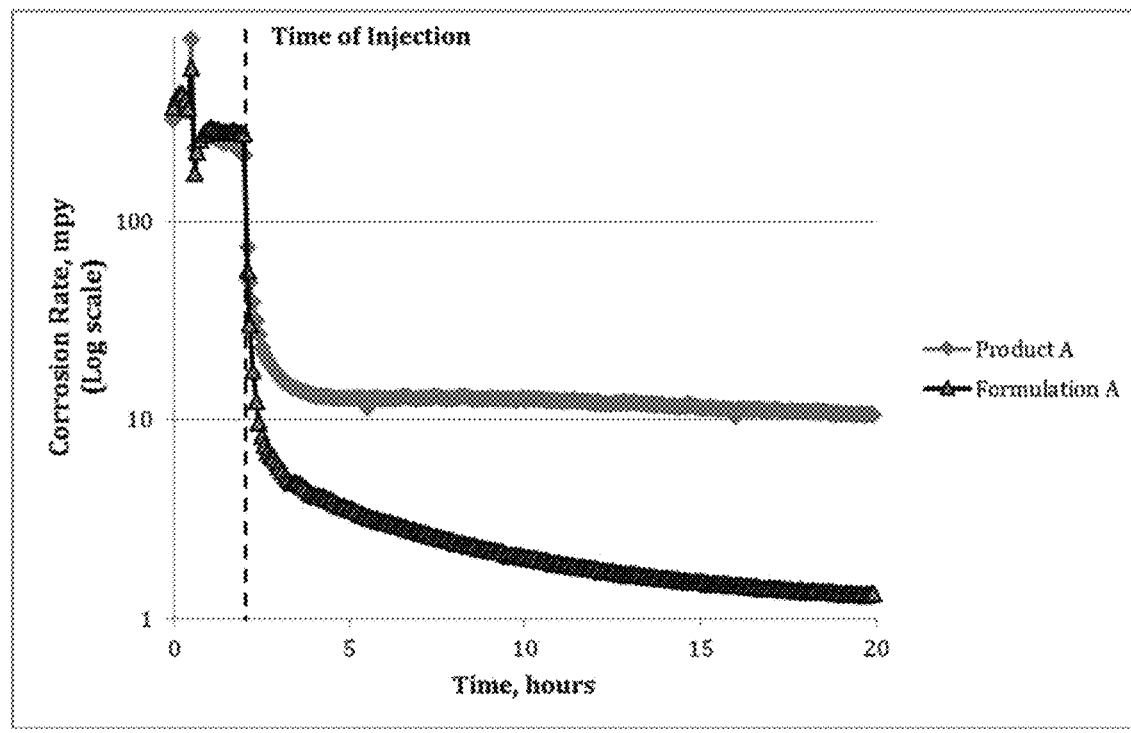
FIG. 1 is a graph comparing the corrosion inhibition performance of an exemplary formulation disclosed herein to a standard commercial product.

It has been discovered that a formulation containing THP+salt, one or more corrosion inhibitors, one or more scale inhibitors, and one or more acid corrosion inhibitors is effective in simultaneously dissolving metal sulfide scales, inhibiting acid gas corrosion, and inhibiting the formation of calcite and barite in a system or fluid. It has also been discovered that the formulation may effectively perform these functions when used and applied in diluted form (i.e. being mixed or combined with water, a brine, a hydrocarbon, or a solvent before or while being introduced) or undiluted form (i.e. neat or without being combined or mixed with water, a brine, a hydrocarbon before or while being introduced), and continuously injected or in batch style to systems or fluids that are stagnant or flowing with turbulence (causing high shear stress on pipe walls).

The formulations and methods disclosed herein may be used and performed in various systems.

"System" is broadly defined herein to be an oilfield or subterranean system that includes a fluid and any components therein (e.g. pipes or conduits where the fluid may flow through or alongside). In one non-limiting embodiment, the system may be defined as any environment in which a corrodible material will be or to which a corrodible material, such as metal that may be steel or mild steel, is exposed, or any environment having a metal surface in physical contact with a production fluid, a brine, a crude oil or a fraction thereof, or a wet hydrocarbon containing gas, such as may be obtained from an oil and/or gas well. In another non-limiting embodiment, the system may be defined to be fluids having an aqueous continuous phase where the aqueous continuous phase can be all water, brine, seawater, and combinations thereof; an oil-in-water emulsion, or an oil-in-brine emulsion; and combinations thereof, or an injection fluid that comprises recycled production water that is injected back into a subterranean formation.

Table 1 sets forth exemplary embodiments of the formulation.

TABLE 1

| Compound (Weight %) | Formulation A-K |
|---|---|
| Quaternary ammonium compounds | 5-15 |
| Sulfur compound (2-mercaptoethanol) | 2-10 |
| Organic phosphate ester with a variable alkyl group | 2-10 |
| Tetrakis(hydroxymethyl)phosphonium sulfate or THPS | 15-5 |
| Quaternized imidazoline | 2-12 |
| Acetic Acid | 0-5 |
| Solvent (water, methanol) | 30-60 |
| Ethylene glycol | 0-5 |
| Surfactants | 0-3 |
| Amine phosphonate | 2-7 |
| Amine | 0-5 |
| Alcohols with acetylenic bond in the carbon backbone | 0-10 |
| Modified thiourea | 0-5 |

In these exemplary formulations, the tetrakis(hydroxymethyl)phosphonium sulfate or THPS is used as the THP+salt for metal sulfide dissolution. But, the THP+salt may be any tetrakis hydroxyorgano phosphonium compound having other types of anions, such as, chloride, phosphate, bromide, fluoride, carbonate, citrate, lactate, tartrate, borate, silicate, formate and acetate.

The metal sulfide being dissolved by the THP+salt in the exemplary embodiments is iron sulfide. These formulations may also be used to dissolve other metal sulfides that may be present in the system such as, lead sulfide or zinc sulfide.

The 2-mercaptoethanol, the organic phosphate ester with a variable alkyl group, and the quaternized imidazoline are known acid gas corrosion inhibitors. The 2-mercaptoethanol is included to be effective in sweet conditions and in environments with low and high shear stress. The organic phosphate ester with a variable alkyl group is included to be effective in sweet and sour conditions and in environments with high shear stress. It may also work in the presence of oxygen. The quaternized imidazoline is included to be in effective in sour conditions.

The alcohols with acetylenic bond in the carbon backbone, such as propargyl alcohol and 4 ethyl-1-octyn-3-ol, are included the exemplary formulations as acid corrosion inhibitors, which reduces, minimizes or inhibits corrosion of metal surfaces in low pH environments and is capable of protecting against the inherent corrosiveness of the THP+ salt. Other suitable acid corrosion inhibitors include modified thiourea polymer and acylated polyamine.

The amine phosphonate in the exemplary formulation is included to be effective as a barite and calcite scale inhibitor. Other organo phosphonate compounds may also be used instead or in addition to amine phosphonates.

The quaternary ammonium compounds operate in the exemplary formulations as surfactants. Alcohols, such as alkyl ethoxylated alcohols may also be included in the formulation as surfactants.

The acetic acid is optionally present in the exemplary formulations to improve the stability of the amine compounds.

Optional solvents include, but are not necessarily limited to, water, methanol, and ethylene glycol.

The exemplary formulations set forth in Table 1 may be applied or added to a system to simultaneously dissolve metal sulfide scales in the system, inhibit corrosion caused by acid gases in the system, and inhibit the formation of calcite and barite in the system.

The formulations may suppress, inhibit, or decrease the amount of and/or the rate of corrosion of the metal surface or rate of scale precipitation within the system. That is, it is not necessary for corrosion of the metal surface or scale precipitation to be entirely prevented by the formulations and methods discussed herein to be considered effective.

The system to which the formulation disclosed herein may be added may also have low or high shear stress conditions in which the fluid or gas flow is relatively near stagnant or turbulent, respectively. High shear conditions may be defined as systems in which the wall shear stress is higher than 15-20 Pascals. Low shear conditions may be defined as shear conditions below that range.

In one instance, the formulation is injected into a subterranean reservoir or wellbore directly along the casing or directly into the annulus (i.e. space between the well tubing outer diameter and inner diameter of the well casing) where it flows until it contacts any fluid in the wellbore. The formulation may also be injected into the well tubing or annulus using a capillary string. The formulation may also be injected into surface equipment (e.g. flow lines, separators). However, it will be appreciated that the method and formulation described herein may be applicable outside the exploration for and production of hydrocarbons.

As mentioned above, the exemplary formulations of Table 1 are inhibited because they include components that limit or curtail the inherent corrosiveness of the THP+salt toward any metal surface, such as steel or mild steel, that the formulation may contact within the system in which it is used. As such, the exemplary formulations may be delivered or injected to the system in undiluted or diluted form.

The formulations may also be injected into the system continuously (i.e. injection of a constant stream of the formulation or mixture containing the formulation) or in batch form, where, in one non-limiting embodiment, an amount of a formulation is injected into the system with a slug of water on a determined frequency.

The amount or dose of formulation may range from greater than 0 ppm independently to about 50,000 ppm independently; alternatively between about 100 ppm independently to about 5,000 ppm independently; and alternatively between about 100 ppm to about 750 ppm independently based on the amount of total fluids in the system to which the formulation is being applied. The term "independently" as used herein with respect to a range means that any threshold may be combined any other threshold to give a suitable alternative range.

The invention will be further described with respect to the following Examples, which are not meant to limit the invention, but rather to further illustrate the various embodiments.

EXAMPLES

FIG. 1 illustrates the corrosion inhibition performance of an exemplary formulation (Formulation A) as compared to a standard commercial product. As shown in the graph, the same amount of a benchmark, standard commercial THPS based product with a corrosion inhibitor, Product A, has a higher corrosion rate than the exemplary Formulation A.

Formulation A was then tested in a high-speed autoclave test. The dosage of Formulation A was 250 ppm on a volume basis. A weight loss method was used to determine the corrosion rate on a Carbon Steel 1018 coupon. The percent protection was determined in the test conditions set forth in Table 2 below and compared to the percent protection of coupons in the same conditions but in the absence of a corrosion inhibitor product. The corrosion rate on the coupon in the presence of Formulation A was 7.49 mils per year (mpy), which was equivalent to 95.3% protection (in second Table) whereas the protection rate of the coupons having no presence of a corrosion inhibitor product was 0.0%. This demonstrates Formulation A's ability to significantly decrease the corrosion rate in high shear conditions.

TABLE 2

Test Conditions

| Parameter | Value |
| --- | --- |
| Gas/$CO_2$ | 3.6% |
| Brine/Oil | 100% Synthetic Brine |
| Material | Carbon Steel 1018 |
| Test Duration | 72 hrs |
| Stir Rate | 454 RPM |
| Temperature | 160° F. |
| Total pressure | 75 psig $CO_2$ |

The corrosion inhibition performance of multiple exemplary formulations disclosed herein was also evaluated. The performance of these formulations was tested in a rotating cylinder electrode (RCE). Each formulation, with the exception of Product A and Formulation B, was tested at dosage of 100 ppm in an undiluted form. Product A and Formulation B were diluted with MeOH to a similar level of active corrosion inhibitor components in Formulation A. As shown in Table 3, each exemplary formulation demonstrated a higher degree of corrosion inhibition compared to the commercial corrosion inhibitor, Product A. The scale inhibitor (Scale Inhibitor A) was tested independently at an equivalent activity to the scale inhibitor in Formulation A to see its impact on the corrosion inhibition performance. The results also show that Scale Inhibitor A is a weak corrosion inhibitor compared to the other chemicals. These results confirm that the exemplary formulations can inhibit corrosion under high shear conditions.

TABLE 3

| Test Chemical | Initial Avg CR, mpy | Final Avg CR, mpy | % inhibition |
| --- | --- | --- | --- |
| Product A | 235.5 | 10.59 | 95.5% |
| Formulation B | 297.7 | 1.54 | 99.5% |
| Scale Inhibitor A | 316.4 | 135.18 | 57.3% |
| Formulation C | 282.9 | 1.16 | 99.6% |
| Formulation A | 303.5 | 1.32 | 99.6% |
| Formulation A | 280.6 | 1.33 | 99.5% |
| Formulation A | 278.1 | 1.11 | 99.6% |
| Formulation A | 320.3 | 1.13 | 99.6% |
| Formulation A | 299.5 | 0.89 | 99.7% |
| Formulation D | 298.2 | 1.13 | 99.6% |
| Formulation E | 105.0 | 1.18 | 98.9% |
| Formulation F | 289.3 | 1.38 | 99.5% |
| Formulation G | 208.0 | 1.01 | 99.5% |
| Formulation H | 285.0 | 1.13 | 99.6% |
| Formulation H | 304.8 | 1.30 | 99.6% |

TABLE 3-continued

| Test Chemical | Initial Avg CR, mpy | Final Avg CR, mpy | % inhibition |
| --- | --- | --- | --- |
| Formulation I | 301.9 | 1.15 | 99.6% |
| Formulation I | 305.8 | 1.37 | 99.6% |
| Formulation J | 202.0 | 1.27 | 99.4% |
| Formulation J | 299.8 | 0.99 | 99.7% |
| Formulation K | 278.1 | 0.75 | 99.7% |
| Formulation K | 288.6 | 0.98 | 99.7% |

Table 4 illustrates the reduced corrosiveness and metal compatibility of a few exemplary inhibited THP+salt formulations disclosed herein (Formulations A, B, and C).

TABLE 4

| Material | Chemical | Initial Wt., g | Final wt., g | Wt. loss, g | Corrosion rate, mpy |
| --- | --- | --- | --- | --- | --- |
| 1018 | Product A | 8.0976 | 7.9656 | 0.1320 | 39.1 |
| 1018 | Product A | 8.0977 | 7.9405 | 0.1572 | 41.0 |
| 1018 | Formulation A | 8.1632 | 8.0896 | 0.0736 | 21.8 |
| 1018 | Formulation A | 8.0095 | 7.9326 | 0.0769 | 20.1 |
| 1018 | Formulation B | 8.2917 | 8.226 | 0.0657 | 17.1 |
| 1018 | Formulation B | 8.2473 | 8.1788 | 0.0685 | 17.9 |
| 1018 | Formulation C | 8.1968 | 8.1273 | 0.0695 | 18.1 |
| 1018 | Formulation C | 8.0619 | 7.9938 | 0.0681 | 17.8 |

The corrosion rate was determined by weighing the metal coupon used before and after exposure to the undiluted exemplary formulation. Mils per year (mpy) is defined to be thousandths of an inch (mils) of wall loss per year.

As shown in Table 4, an amount of a benchmark, standard commercial product, Product A, caused the material 1018, which is a type of mild steel, to corrode significantly more than an equivalent amount of undiluted exemplary Formulations A, B, and C. The amount of THPS in Product A is the same or comparable to the amount in exemplary Formulations A, B and C.

Additional testing was done on the compatibilities of the exemplary neat (i.e. undiluted) formulations with carbon 1018 mild steel (C1018) coupons. These tests were performed to evaluate the degree of corrosion the neat formulation would have on the casing or tubing outer diameter when the undiluted formulation would contact bare mild steel in the well bore. The compatibility test was conducted at a temperature of 150° F. for the candidate formulations. A C1018 coupon was immersed in each candidate formulation in a sealed glass vial that was not deaerated to mimic field conditions. The pressure in each vial was atmospheric at room temperature at the time of filling. The surface area of C1018 coupon was 9.019 $cm^2$. The coupons were immersed and incubated for 7 days.

Results in Table 5 below show Formulations A, M and N drastically improved the compatibility with mild steel compared to Product A. Formulations M and N had more propargyl alcohol than Formulation A by a factor of ~2. Formulations H and I showed a slight improvement over Product A. Formulation D had a lower corrosion rate, but showed pitting, whereas other formulations did not. Overall, the test formulations increased the corrosiveness compared to Product A.

TABLE 5

| Chemical | CR, mpy | Avg CR, mpy | Std Dev, mpy | % change |
|---|---|---|---|---|
| Product A | 39.1 | 40.0 | 1.0 | — |
|  | 41.0 |  |  |  |
| Formulation C | 59.4 | 51.0 | 8.4 | 27% |
|  | 42.6 |  |  |  |
| Formulation D | 39.2 | 29.8 | 9.3 | −25% |
|  | 20.5 |  |  |  |
| Formulation A | 21.8 | 20.9 | 0.9 | −48% |
|  | 20.1 |  |  |  |
| Formulation E | 54.0 | 45.5 | 8.5 | 14% |
|  | 36.9 |  |  |  |
| Formulation L | 46.5 | 43.2 | 3.2 | 8% |
|  | 40.0 |  |  |  |
| Formulation M | 17.1 | 17.5 | 0.4 | −56% |
|  | 17.9 |  |  |  |
| Formulation N | 18.1 | 18.0 | 0.2 | −55% |
|  | 17.8 |  |  |  |
| Formulation O | 44.7 | 43.9 | 0.8 | 10% |
|  | 43.1 |  |  |  |
| Formulation H | 37.3 | 37.3 |  | −7% |
| Formulation I | 32.6 | 32.6 |  | −19% |
| Formulation J | 74.6 | 74.6 |  | 86% |
| Formulation K | 68.0 | 68.0 |  | 70% |

To understand how an exemplary formulation of the kind disclosed herein may perform in the field, Formulation A was applied to nine (9) oil producing wells in the Permian basin. Each well produced a combination of oil, natural gas and water. The fluids from the wells were lifted via a gas lift mechanism. These wells were challenged by:
1. Accumulation of solids comprised of iron sulfide and calcium carbonates scale in the production tubing
2. Underdeposit corrosion in the production tubing
3. $CO_2$ corrosion accelerated by high velocities of liquids and gases (produced and lift gas)

Formulation A was injected continuously through a capillary tube starting at the surface of the well to the end of the production tubing inside of the wellbore. The initial dosage was set at 250 ppm based on the volume of the produced water. The dosage was changed in the middle of the 5$^{th}$ month of testing with Formulation A to 150 ppm in an attempt to find the minimum effective concentration. After some testing, the dosage was increased to 200 ppm.

To determine corrosion rates, coupons were installed at the wellhead of each of the 9 wells. The average corrosion rate for the coupons installed in each of the 9 wells treated with Formulation A showed a 33%-72% improvement compared to the average coupon corrosion rate when wells were treated with incumbent Product B, a corrosion inhibitor and scale inhibitor combination product available in the market. These corrosion rates are well below the operator's key performance indicator (KPI). See Table 6 below.

Using the same test wells, the ability of Formulation A to prevent solids (iron sulfides and scale) from forming and/or accumulating downhole in the production tubing was also monitored. This was done by analyzing the content of solids that were filtered from produced water over time. Produced water from each well was collected on a monthly basis. The solids in the produced water were filtered out and dissolved by various solvents. The solids that were acid-soluble were dissolved in acid to determine the content of oxides, sulfides, and carbonates. (Sulfides are converted to oxides once the solid is collected and exposed to air, thus it is measured to determine the total sulfide solids.)

A formulation that is effective at dissolving iron sulfides should decrease the ratio of the of sulfides (and oxides) solids to carbonates (sulfides:carbonates). One could also expect that the total acid-soluble solids would also decrease, subsequently. However, this anticipated decrease in the amount of total acid-soluble solids could be offset or overcome by the solids, primarily carbonates, which are no longer accumulating in the wellbore. Thus, the percentage of acid-soluble solids in the sample could also remain stable or increase.

Figure 2:
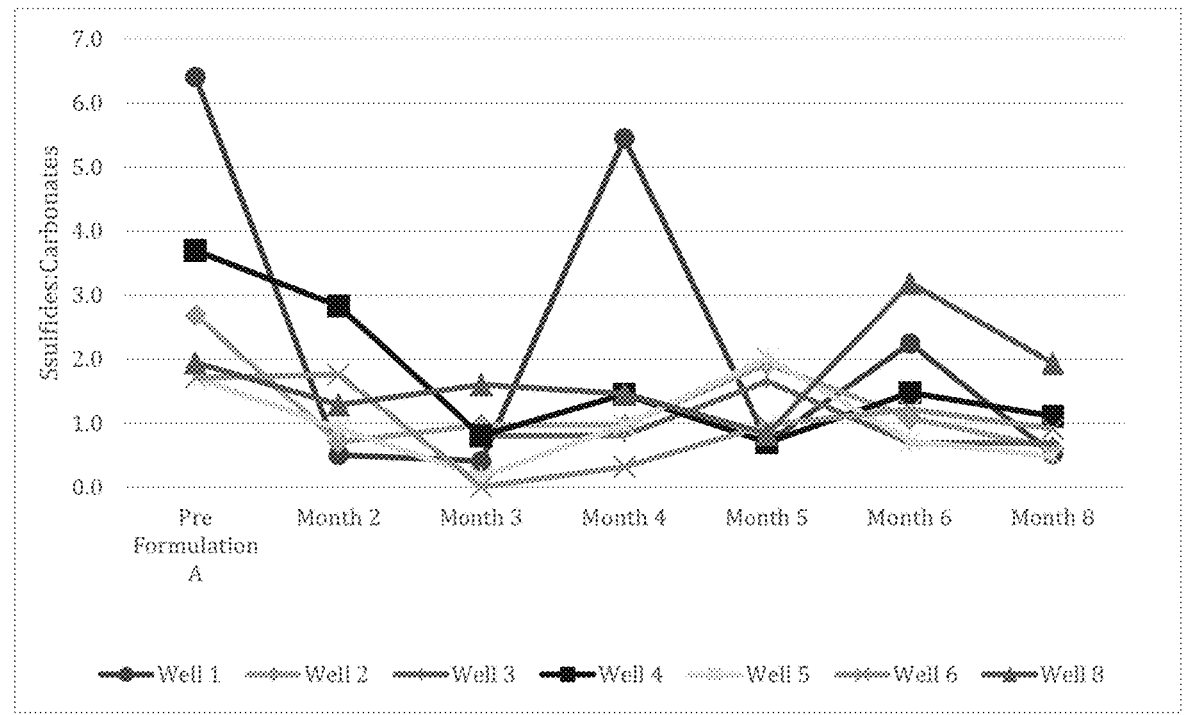
FIG. 2 is a graph showing the ratio level of sulfides to carbonates in several test wells upon application of an exemplary formulation disclosed herein over a period of eight months.

As shown in FIG. 2, generally, the sulfides:carbonates ratio decreased for each well during the use of Formulation A compared to the levels measured at pre-treatment. This result demonstrates that Formulation A is dissolving sulfide-based solids in the wellbore. The effect of decreasing the dosage of Formulation A from 250 ppm to 150 ppm prior to Month 6 is most likely observed in wells 1, 3 and 8, where increases in sulfides caused an increase in the ratio.

Figure 3:
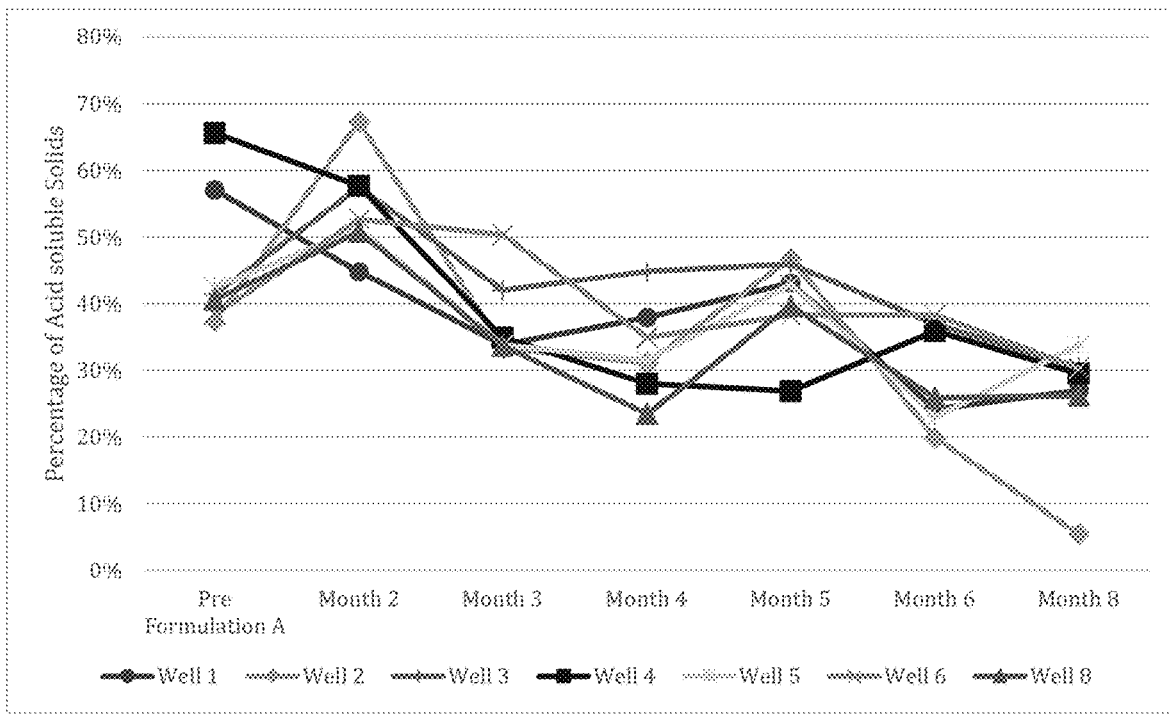
FIG. 3 is a graph showing the percentage of acid-soluble solids in several test wells upon application of an exemplary formulation disclosed herein over a period of eight months.

FIG. 3 shows that the percentage of acid-soluble solids also trended downward during the application of Formulation A for each trial well. This result suggests that Formulation A is dissolving sulfides effectively and preventing the formation of carbonate scales from forming. There appears to be no noticeable effect on acid dissolution from decreasing the dose rate of Formulation A Then, Formula A and a standard commercial corrosion inhibitor/scale inhibitor product, Product C, were applied in treating multiple gas producing wells to overcome the following challenges:
1. Significant accumulation of iron sulfide solids in annular fluid column on the outer surface of the production tubing, inner surface of the casing tubing, as well as in the production tubing
2. Corrosion of annular casing and production tubing metallurgy caused by $H_2S$ and $CO_2$
3. Moderate tendency to form barium sulfate and calcium carbonate scales when waters that are produced from multiple perforated zones are mixed in the wellbore
4. Limited means for apply the formulations in batch style

TABLE 6

| Well # | Month 3 | Month 4 | Month 5 | Month 6 | Month 7 | Month 8 | Avg. MPY | Compared to Product B | % below KPI |
|---|---|---|---|---|---|---|---|---|---|
| Well 1 | 0.34 | 0.22 | 0.19 | 0.56 | 0.33 | 0.27 | 0.32 | −58% | −68% |
| Well 2 | 0.14 | 0.12 | 0.20 | 0.24 | 0.33 | 0.24 | 0.21 | −72% | −79% |
| Well 3 | 0.22 | 0.17 | 0.24 | 0.42 | 0.27 | 0.23 | 0.26 | −66% | −74% |
| Well 4 | 0.61 | 0.36 | 0.55 | None | None | None | 0.51 | −33% | −49% |
| Well 5 | 0.28 | 0.15 | 0.21 | 0.84 | 0.30 | 0.26 | 0.34 | −55% | −66% |
| Well 6 | 0.15 | 0.17 | 0.31 | 0.29 | 0.29 | 0.20 | 0.24 | −69% | −77% |
| Well 7 | 0.49 | 0.38 | 0.32 | 0.38 | 0.44 | 0.29 | 0.38 | −50% | −62% |
| Well 8 | 0.37 | 0.29 | 0.20 | 0.77 | 0.18 | 0.28 | 0.35 | −54% | −65% |
| Well 9 | 0.44 | 0.21 | 0.18 | 0.51 | 0.25 | 0.30 | 0.32 | −59% | −69% |

5. Slipstream and capillary string applications are not suitable, thus annular continuous injection is the only suitable option
6. Low turbulence in fluid column. Chemicals must disperse well in water without much agitation.

The treated gas wells were vertical and completed in multiple zones in the formation. Due to operator's production rates, high fluid levels, up to 1500 ft. above the end of production tubing, were often maintained. The formation pressure of the wells had declined over time, so a plunger lift mechanism assisted the removal of fluids at the bottom of the production tubing in order to produce gas. The wells were not equipped with a capillary string. Therefore, the undiluted Formulation A was injected directly into the annulus.

Formulation A and Product C were brought into contact with the inner diameter of the annular casing and/or outer diameter of the production tubing until it reached the annular fluid column and diffused in to the fluid volume.

A slickline tool was used to physically determine the degree of solid accumulation occurring on the inner diameter of the production tubing after application of Formulation A and Product C. An index was created to indicate the degree of accumulation: 1 represented a smooth trip for the tool, indicating insignificant buildup and 7 represented a condition in which the slickline tool cannot travel downward without significant force exerted on the tool. An index value of 7 triggered a workover to replace the tubing.

Figure 4:
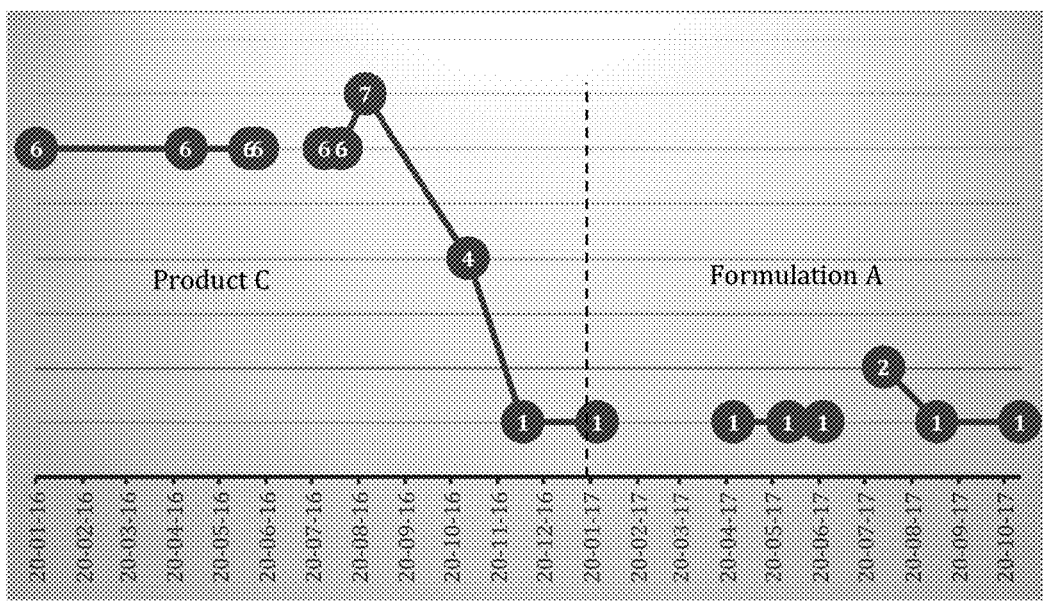
FIG. 4 is a graph showing the solids accumulation index in gas wells treated with an exemplary formulation disclosed herein as compared to the solids accumulation index in the same gas well treated with a standard commercial product.

FIG. 4 shows that Formulation A caused the accumulation of less solids in production tubing than Product C. This suggests that iron sulfides are being dissolved in the annulus by Formulation A. This data is representative of the general response observed during the application of Formulation A in other field tests. There was occasionally an outlier, where the slickline reading increased beyond 2.

Figure 5:
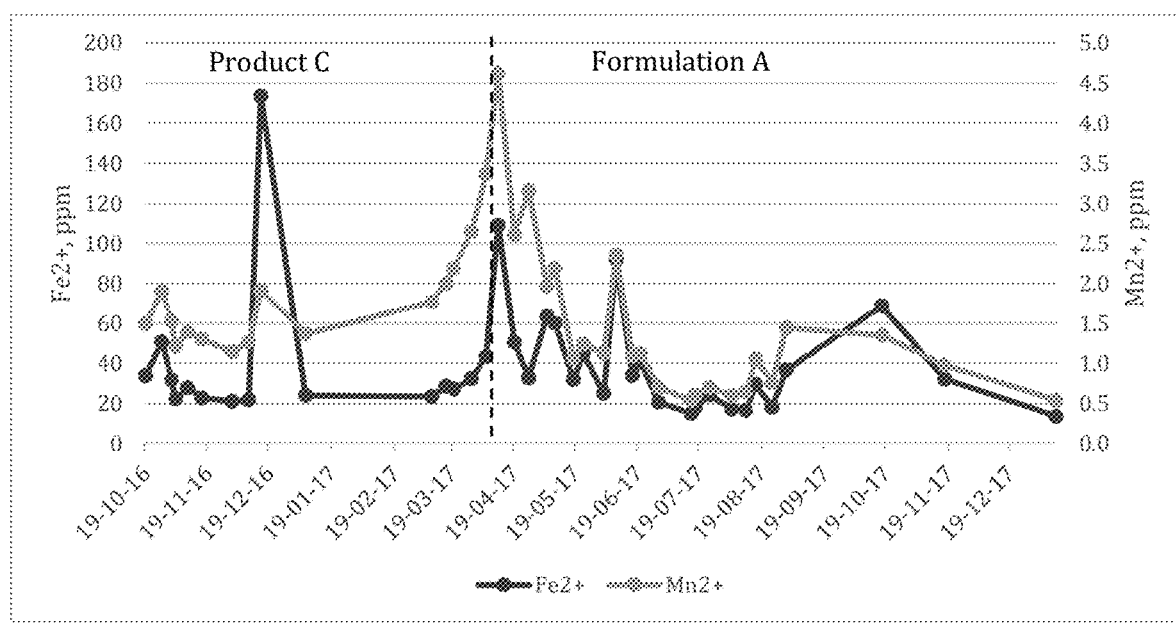
FIG. 5 is a graph showing the Fe2+ and Mn2+ counts in water samples collected from a separator downstream of wells that were treated with an exemplary formulation disclosed herein as compared to the Fe2+ and Mn2+ counts in water samples collected from a separator downstream of wells that were treated with a standard commercial product.

Another set of tests based upon the measurements taken from water samples collected from the separator downstream of the wellhead indicated that applying Formulation A generally resulted in a decrease in the iron (Fe2+) and manganese (Mn2+) counts as opposed to when Product C was used, which resulted in a general increase in these counts. See FIG. 5.

In the instances where Formulation A was applied but did result in a decrease in iron (Fe2+) and/or manganese (Mn2+) counts, levels for both cations were maintained within acceptable limits after stabilizing. Also, an initial increase in Fe2+ and Mn2+ counts was observed at the start of treatment with Formulation A. It is suspected that this initial increase could be due to releases of free Fe2+ and Mn2+ from solid compounds as THP+salt dissolves the solids in the wellbore.

In the foregoing specification, the invention has been described with reference to specific embodiments thereof, and has been described as effective in providing methods for decreasing, reducing, or inhibiting corrosion of a metal surface in a high temperature environment. However, it will be evident that various modifications and changes can be made thereto without departing from the broader scope of the invention as set forth in the appended claims. Accordingly, the specification is to be regarded in an illustrative rather than a restrictive sense. For example, the one or more (hydroxyorgano) phosphonium salts, one or more acid gas corrosion inhibitors, one or more scale inhibitors, solvents, surfactants, fluids, treatment conditions, metals, metal sulfide scales, dosages, may be different than those described and/or exemplified herein, but still fall within the formulations and methods described in the claims.

The formulations and methods of the present disclosure may also suitably comprise, consist or consist essentially of the elements disclosed and may be practiced in the absence of an element not disclosed. In a non-limiting example the formulation for simultaneously dissolving metal sulfide scales, inhibiting acid gas corrosion, and inhibiting the formation of calcite and barite in a system may comprise, consist essentially of, or consist of one or more tetrakis (hydroxyorgano) phosphonium salt, one or more acid gas corrosion inhibitors, one or more scale inhibitors, and one or more acid corrosion inhibitors.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A formulation for simultaneously dissolving metal sulfide scales, inhibiting acid gas corrosion, and inhibiting the formation of calcite and barite in a system, the formulation comprising:
   15 wt % to 35 wt % of one or more tetrakis (hydroxyorgano) phosphonium salt,
   from 6 wt % to 30 wt % one or more acid gas corrosion inhibitors,
   from 2 wt % to 7 wt % of one or more scale inhibitors, and
   from greater than 0 wt % to 10 wt % of one or more acid corrosion inhibitors, all based on the formulation.

2. The formulation according to claim 1 where the tetrakis (hydroxyorgano) phosphonium salt comprises an anion selected from the group consisting of sulfate, chloride, phosphate, bromide, fluoride, carbonate, citrate, lactate, tartrate, borate, silicate, formate and acetate.

3. The formulation according to claim 1 where the tetrakis (hydroxyorgano) phosphonium salt is tetrakis(hydroxymethyl)phosphonium sulfate.

4. The formulation according to claim 1 where the one or more acid gas corrosion inhibitors is selected from a group consisting of a sulfur compound (2-mercaptoethanol), an organic phosphate ester with a variable alkyl group, and quaternized imidazoline.

5. The formulation according to claim 1 where the one or more acid corrosion inhibitors is an alcohol with an acetylenic bond in the carbon backbone, a modified thiourea polymer, and/or an acylated polyamine.

6. The formulation according to claim 5 where the alcohol with an acetylenic bond in the carbon backbone is selected from of a group consisting of propargyl alcohol, 4 ethyl-1-octyn-3-ol, and combinations thereof.

7. The formulation according to claim 1 where the one or more acid corrosion inhibitors is propargyl alcohol.

8. The formulation according to claim 1 where the formulation further comprises surfactants selected from the group consisting of quaternary ammonium compounds, alkyl ethoxylated alcohols, and combinations thereof.

9. The formulation according to claim 1 where the scale inhibitor is an amine phosphonate.

10. A formulation for simultaneously dissolving metal sulfide scales, inhibiting acid gas corrosion, and inhibiting the formation of calcite and barite in a system, the formulation comprising:
  15 wt % to 35 wt % of one or more tetrakis (hydroxyorgano) phosphonium salt,
  from 6 wt % to 30 wt % one or more acid gas corrosion inhibitors selected from a group consisting of 2-mercaptoethanol, an organic phosphate ester with a variable alkyl group, a quaternized imidazoline, and combinations thereof,
  from 2 wt % to 7 wt % of one or more amine phosphonate scale inhibitors,
  from greater than 0 wt % to 10 wt % of one or more acid corrosion inhibitors selected from the group consisting of an alcohol with an acetylenic bond in the carbon backbone selected from the group consisting of propargyl alcohol, 4 ethyl-1-octyn-3-ol, and combinations thereof, and
  from greater than 0 wt % to 3 wt % of one or more surfactants selected from the group consisting of quaternary ammonium compounds, alkyl ethoxylated alcohols, and combinations thereof, all based on the formulation.

11. The formulation according to claim 10 where the tetrakis (hydroxyorgano) phosphonium salt comprises an anion selected from the group consisting of sulfate, chloride, phosphate, bromide, fluoride, carbonate, citrate, lactate, tartrate, borate, silicate, formate and acetate.

12. The formulation according to claim 10 where the tetrakis (hydroxyorgano) phosphonium salt is tetrakis(hydroxymethyl)phosphonium sulfate.

13. The formulation according to claim 10 where the one or more acid corrosion inhibitors is propargyl alcohol.

14. A treated fluid system, the treated fluid system comprising:
  a fluid selected from a group consisting of a production fluid, a brine, a crude oil or a fraction thereof, a wet hydrocarbon containing gas, and combinations thereof
  a formulation comprising
    from 15 wt % to 35 wt % of tetrakis (hydroxyorgano) phosphonium salt,
    from 6 wt % to 30 wt % of one or more acid gas corrosion inhibitors,
    from 2 wt % to 7 wt % of one or more scale inhibitors, and from greater than 0 wt % to 10 wt % of one or more acid corrosion inhibitors, all based on the formulation,
  where the formulation is added to the treated fluid system in high shear conditions of wall stress higher than 15 Pascals.

15. The treated fluid system of claim 14 where the tetrakis (hydroxyorgano) phosphonium salt is tetrakis(hydroxymethyl)phosphonium sulfate.

16. The treated fluid system of claim 14 where the one or more acid gas corrosion inhibitors is selected from a group consisting of 2-mercaptoethanol, an organic phosphate ester with a variable alkyl group, a quaternized imidazoline, and combinations thereof.

17. The treated fluid system of claim 14 where the one or more acid corrosion inhibitors is propargyl alcohol.

18. The treated fluid system of claim 14 where the formulation further comprises at least one surfactant selected from the group consisting of quaternary ammonium compounds, alkyl ethoxylated alcohols, and combinations thereof.

19. The treated fluid system of claim 14 where the scale inhibitor is an amine phosphonate.

20. The treated fluid system of claim 14 where the formulation is present in an amount that is greater than 0 ppm and less than 50,000 ppm based upon the total volume of fluid in the system.

* * * * *